US010053126B2

(12) United States Patent
Buttimer

(10) Patent No.: US 10,053,126 B2
(45) Date of Patent: Aug. 21, 2018

(54) UTILITY CART FOR TRANSPORT OF PAYLOADS

(71) Applicant: Tony Buttimer, Savannah, GA (US)

(72) Inventor: Tony Buttimer, Savannah, GA (US)

(*) Notice: Subject to any disclaimer, the term of this patent is extended or adjusted under 35 U.S.C. 154(b) by 0 days.

(21) Appl. No.: 15/156,292

(22) Filed: May 16, 2016

(65) Prior Publication Data
US 2016/0332649 A1 Nov. 17, 2016

Related U.S. Application Data

(60) Provisional application No. 62/161,672, filed on May 14, 2015.

(51) Int. Cl.
B62B 1/24 (2006.01)
B62B 3/08 (2006.01)
B62B 1/18 (2006.01)
B62B 5/06 (2006.01)

(52) U.S. Cl.
CPC ............. *B62B 3/08* (2013.01); *B62B 1/186* (2013.01); *B62B 1/24* (2013.01); *B62B 5/06* (2013.01); *B62B 2203/70* (2013.01)

(58) Field of Classification Search
CPC .. B62B 1/18; B62B 1/186; B62B 1/20; B62B 1/24
USPC .................. 280/653, 47.32; 298/3
See application file for complete search history.

(56) References Cited

U.S. PATENT DOCUMENTS

| | | | | | |
|---|---|---|---|---|---|
| 95,717 | A | * | 10/1869 | Noling | B62B 1/24 105/308.2 |
| 1,201,123 | A | * | 10/1916 | Walworth | B62B 1/24 280/47.34 |
| 4,223,907 | A | * | 9/1980 | Kelly | B62B 1/002 280/408 |
| 4,270,786 | A | * | 6/1981 | Mattox | B62B 1/24 280/47.32 |
| 4,589,508 | A | * | 5/1986 | Hoover | B62B 1/24 180/13 |
| 4,767,128 | A | * | 8/1988 | Terhune | B62B 1/18 188/19 |
| 5,026,079 | A | * | 6/1991 | Donze | B62B 1/20 280/47.31 |
| 5,031,926 | A | * | 7/1991 | Wannamaker | B62B 1/20 280/47.2 |
| 5,033,760 | A | * | 7/1991 | Evans | B62B 1/20 280/47.26 |
| 5,087,061 | A | * | 2/1992 | Wallace | B62B 1/20 280/30 |
| 5,106,113 | A | * | 4/1992 | Piacentini | B62B 1/22 280/38 |

(Continued)

Primary Examiner — Jeffrey J Restifo
(74) Attorney, Agent, or Firm — John G. Posa; Belzer PC

(57) ABSTRACT

Embodiments of a utility cart according to the solution feature a three front-wheel arrangement on a common axle and a pair of swiveling rear wheels attached to a frame. Certain embodiments feature a sub-frame that is releasably locked to a main frame portion such that, when the locking mechanism is removed, the sub-frame may be lifted to pivot around the front axle and tip a tub aspect carrying a payload. Certain embodiments may also comprise a handle aspect that is slidably engaged with the frame of the cart such that it can be extended to various positions, including being fully disengaged, flipped and reengaged to translate from a push state for a manual user to a pull state for a hitch.

5 Claims, 15 Drawing Sheets

(56) References Cited

U.S. PATENT DOCUMENTS

| | | | | |
|---|---|---|---|---|
| 5,149,116 A * | 9/1992 | Donze | B62B 1/20 | 280/47.26 |
| 5,284,218 A * | 2/1994 | Rusher, Jr. | B62B 3/04 | 180/19.1 |
| 5,350,030 A * | 9/1994 | Mawhinney | B62B 1/24 | 180/19.3 |
| 5,601,298 A * | 2/1997 | Watanabe | B62B 1/22 | 280/47.31 |
| 5,758,887 A * | 6/1998 | Bobst | B62B 1/18 | 280/47.24 |
| 5,884,924 A * | 3/1999 | Fairchild | B62B 1/18 | 280/47.31 |
| 5,915,706 A * | 6/1999 | Mosley | B62B 1/20 | 280/47.26 |
| 5,924,708 A * | 7/1999 | Bisaillon | B62B 1/18 | 280/47.26 |
| 6,053,515 A * | 4/2000 | Kelley | B62B 1/12 | 280/47.18 |
| 6,220,622 B1 * | 4/2001 | Garcia | B62B 1/20 | 269/17 |
| 6,390,496 B1 * | 5/2002 | Eicher | B62B 1/24 | 280/47.2 |
| 6,446,989 B1 * | 9/2002 | Intengan | B62B 1/20 | 280/47.3 |
| 6,508,478 B1 * | 1/2003 | Ortez | B62B 1/20 | 280/47.31 |
| 6,755,478 B2 * | 6/2004 | Messinger-Rapport | B62B 1/24 | 280/47.31 |
| 6,880,852 B2 * | 4/2005 | Lim | B62B 5/06 | 16/426 |
| 6,886,838 B1 * | 5/2005 | Zimmerman | B62B 1/22 | 280/47.31 |
| 7,232,135 B2 * | 6/2007 | Robinson | B62B 1/18 | 280/47.24 |
| 7,334,803 B2 * | 2/2008 | Gonzalez | B62B 1/22 | 280/47.17 |
| 7,448,691 B2 * | 11/2008 | Brooks | A01D 43/00 | 298/17 T |
| 7,547,026 B2 * | 6/2009 | Morris | B62B 1/18 | 280/47.31 |
| 2003/0006570 A1 * | 1/2003 | Baker | B62B 1/18 | 280/47.17 |
| 2004/0061372 A1 * | 4/2004 | Messinger-Rapport | B62B 1/24 | 298/3 |
| 2004/0164509 A1 * | 8/2004 | Campbell | B62B 1/002 | 280/47.31 |
| 2005/0134012 A1 * | 6/2005 | Kan | B62B 3/08 | 280/47.34 |
| 2006/0033311 A1 * | 2/2006 | Lim | B62B 1/22 | 280/653 |
| 2007/0052187 A1 * | 3/2007 | Browder | B62B 1/18 | 280/47.31 |
| 2007/0085284 A1 * | 4/2007 | Loudon | B60D 1/00 | 280/47.34 |
| 2007/0194544 A1 * | 8/2007 | Price | B62B 1/002 | 280/47.34 |
| 2007/0261905 A1 * | 11/2007 | Lin | B62B 1/18 | 180/213 |
| 2008/0079228 A1 * | 4/2008 | Rye | B62B 1/20 | 280/47.31 |
| 2010/0019472 A1 * | 1/2010 | DiLorenzo, Sr. | B62B 5/04 | 280/653 |
| 2010/0201091 A1 * | 8/2010 | Easterling | B62B 1/20 | 280/47.31 |
| 2016/0144757 A1 * | 5/2016 | Romas | B62B 1/18 | 298/2 |

* cited by examiner

UTILITY CART FOR TRANSPORT OF PAYLOADS

CROSS-REFERENCE TO RELATED APPLICATIONS

Priority under 35 U.S.C. § 119(e) is claimed to U.S. provisional application entitled "UTILITY CART FOR TRANSPORTING PAYLOADS," filed on May 14, 2015 and assigned application Ser. No. 62/161,672, the entire contents of which are hereby incorporated by reference.

BACKGROUND

As any landscaper, construction worker or weekend warrior homeowner will attest, a hard job becomes even harder without the right equipment. Equipment that is not designed for the task at hand, or equipment that is just plain undersized or ill designed for the task at hand, can make a labor-intensive job exponentially harder than it has to be.

As is known in the art, the typical wheelbarrow is a tool commonly used by landscapers and construction workers to transport heavy payloads from one locale to another. Most wheelbarrows comprise a single front wheel, thus requiring a user to take care to not overload the wheelbarrow in weight, as doing so may cause the wheelbarrow to tip over and spill its contents should the user not be strong enough to maintain the balance of the loaded wheelbarrow during use. To combat this problem, wheelbarrow embodiments with two front wheels have come on the market; however, wheelbarrows with two front wheels are prone to bending the front axle when the wheelbarrow is loaded with a heavy payload.

Therefore, what is needed in the art is a heavy-duty wheelbarrow-like utility cart that enables a user to easily transport heavy payloads from one locale to another without risk of tipping.

BRIEF SUMMARY OF THE INVENTION

Various embodiments, aspects and features of the present invention encompass a heavy-duty wheelbarrow-like utility cart with a three-wheeled front axle and pivoting rear wheels. An exemplary embodiment includes a payload tub mounted atop a frame that comprises a handle. In some embodiments, the handle may be extendable from the frame and/or "flippable" such that it may be better oriented for pulling (hitch state) or pushing (manual user state). A front axle may include three or more wheels for providing sturdy support and ease of maneuverability. Advantageously, three or more front wheels mitigate any possibility of bending the axle when under a heavy load. Certain embodiments may also include one or more strut aspects for supporting the tub atop the frame. Moreover, embodiments may include a pair of rear wheels that swiveled so that the cart is easily steered. Certain embodiments may further include a handle that is operable to be hitched to an ATV, tractor or the like. Also, it is envisioned that some embodiments of the solution may further include a tub aspect that is hinged to the frame such that a payload may be dumped from the tub without the need for tipping the entire cart.

Embodiments of a utility cart according to the solution are not limited to the exemplary aspects and features described above or below. Certain embodiments may include additional features, or different features, while other embodiments include alternative features.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

DESCRIPTION

The Figures and the related description are offered for illustrative purposes and depict two exemplary embodiments of a utility cart according to the solution. As such, the exemplary embodiments shown in the Figures do not illustrate all features and aspects that may be included in a given embodiment of a utility cart according to the solution. For instance, it is envisioned that a utility cart according to the solution may be manufactured to any given size suitable for a particular application and/or may be constructed from any combination of materials depending on the intended use of the particular embodiment. For instance, the frame of an embodiment may be constructed from aluminum tubing, or wood, or steel tubing, etc. Moreover, although the two exemplary embodiments shown in the Figures are constructed from round and square tubular materials, respectively, it is envisioned that the specific materials needed to best construct a given embodiment for a given application will occur to those of ordinary skill in the art. As another non-limiting example, the tub aspect of an embodiment may be constructed from plastic, or steel, etc.

The present invention relates to utility carts for transporting payloads and, more particularly, to a heavy-duty wheelbarrow-like utility cart with a three-wheeled front axle and pivoting rear wheels. Certain embodiments may also comprise a frame operable to translate the tub aspect from a transport state to a dump state, as will become more apparent from the drawings and following description. Further, certain embodiments may comprise adjustable frame aspects for lengthening or shortening a handle length, for example.

Figure 1:
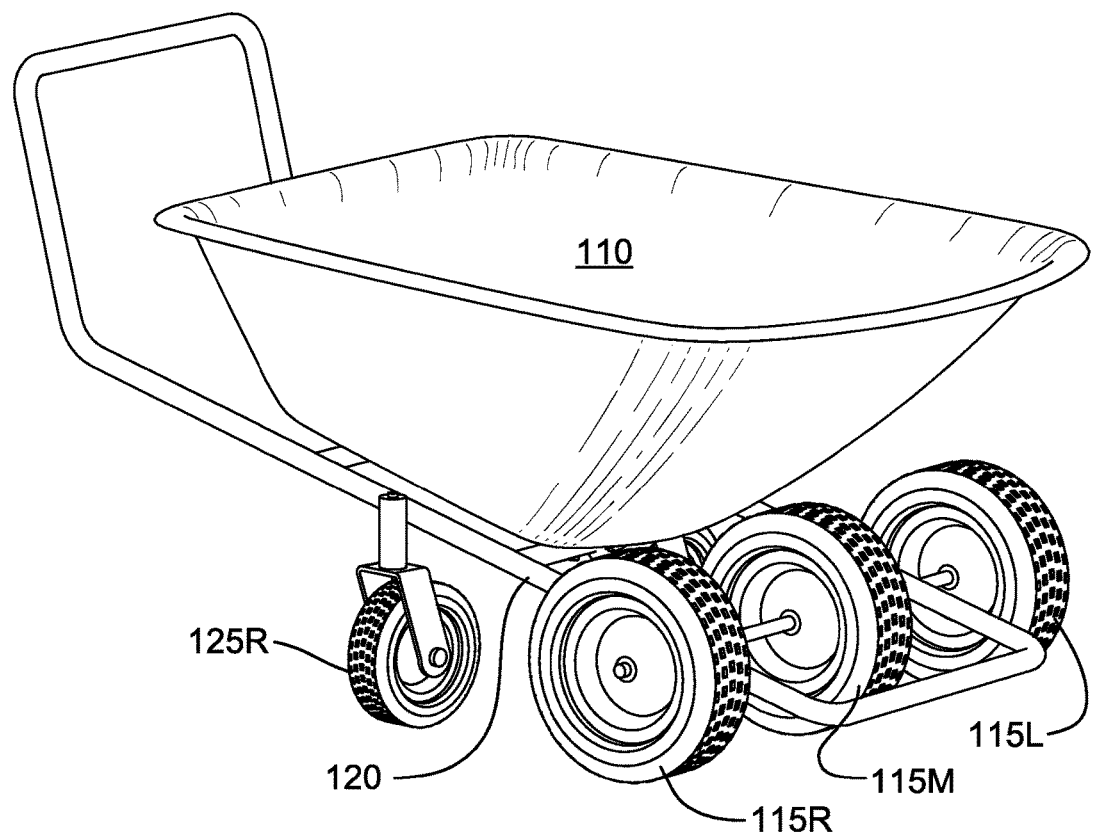
FIG. 1 is a perspective view of an exemplary embodiment of a utility cart according to the solution.

FIG. 1 is a perspective view of an exemplary embodiment of a utility cart according to the solution. As can be seen in the FIG. 1 illustration, the exemplary embodiment includes a tub aspect 110 for carrying a payload (payload not depicted). The tub aspect 110 is fixed atop a frame 120. At the front of the frame 120 is an axle with three wheels 115 mounted thereon. In the FIG. 1 illustration a left front wheel 115L, a middle front wheel 115M, and a right front wheel 115R can be seen. The rear wheels 125 may be swiveled, as would be understood by one of ordinary skill in the art of wheels and casters, so that the embodiment is easily maneuvered. Right rear wheel 125R can be seen in the FIG. 1 illustration.

Figure 2:
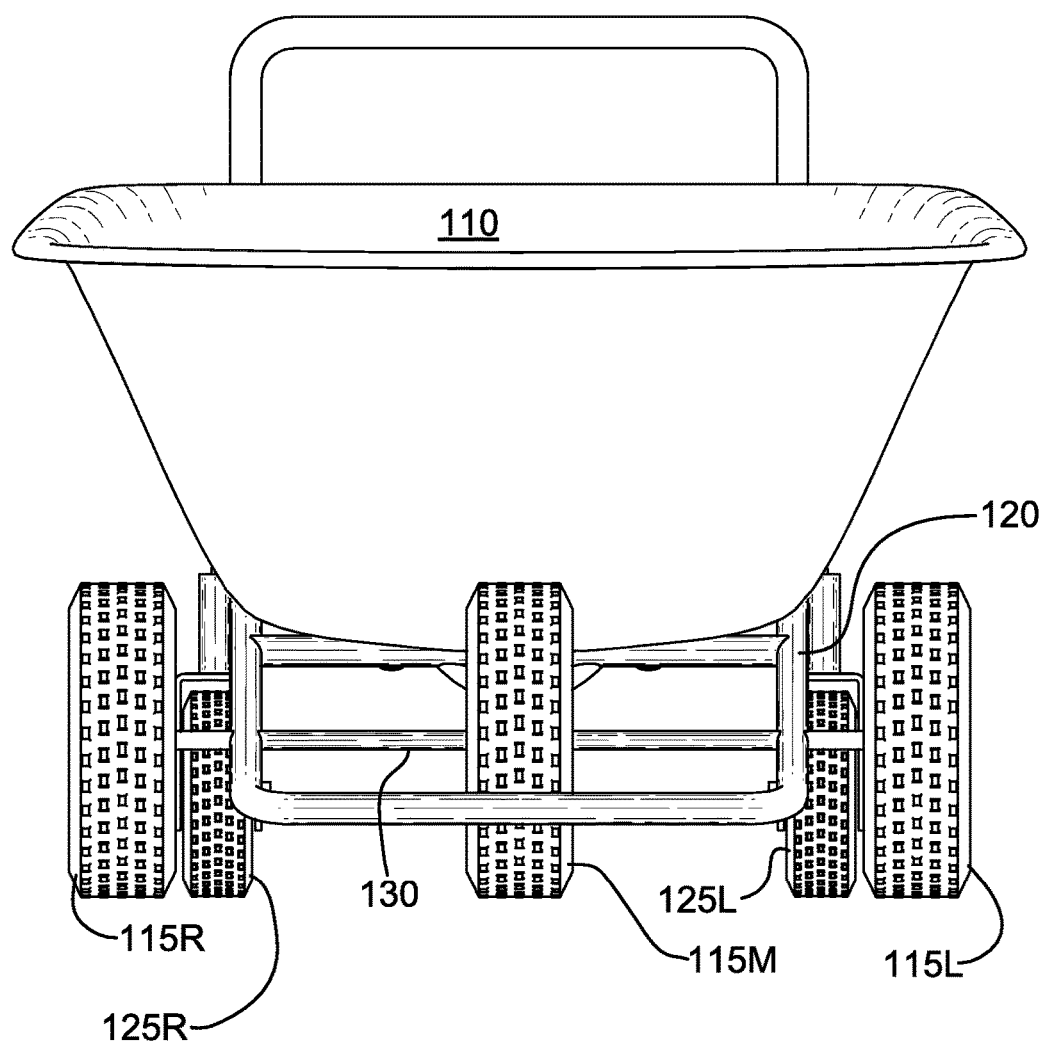
FIG. 2 is a front view of the exemplary embodiment of a utility cart illustrated in FIG. 1.

FIG. 2 is a front view of the exemplary embodiment of a utility cart illustrated in FIG. 1. As can be seen in the FIG. 2 illustration, the frame 120 includes a front bar that, when pitched into the ground, provides for a pivot point to tip the cart and dump a payload. The frame 120 is operable to rotate about axle 130 so that the front bar may be pitched toward the ground, thereby tipping the tub 110, without the front wheels 115 lifting from the ground until the front bar is in contact with the ground.

The axle 130 extends through portions of the frame 120, as would be understood by one of ordinary skill in the art viewing the figures, and supports three wheels 115, thereby enabling the cart to transport heavy payloads without bending the axle 130 or risking unintentional dumping of a payload. Advantageously, the tub 110 may be tipped forward in a stable manner as the three front wheels 115 work to prevent unintentional dumping to one side (such as may occur with wheelbarrows presently known in the art).

Figure 3:
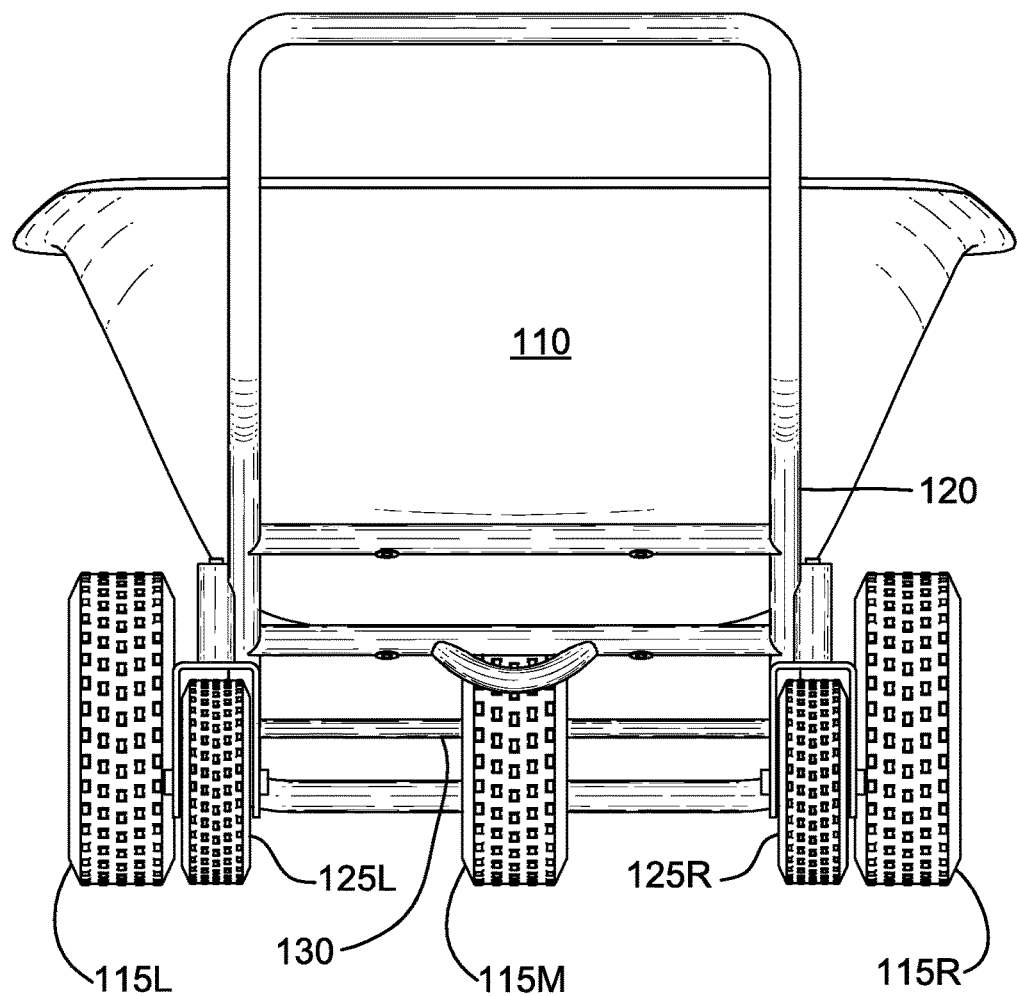
FIG. 3 is a back view of the exemplary embodiment of a utility cart illustrated in FIG. 1.

FIG. 3 is a back view of the exemplary embodiment of a utility cart illustrated in FIG. 1. As can be seen in the FIG. 3 illustration, a handle aspect 150 may be integrated into the frame 120 beneath the tub 110 to provide a leverage point for a user to tip the utility cart.

Figure 4:
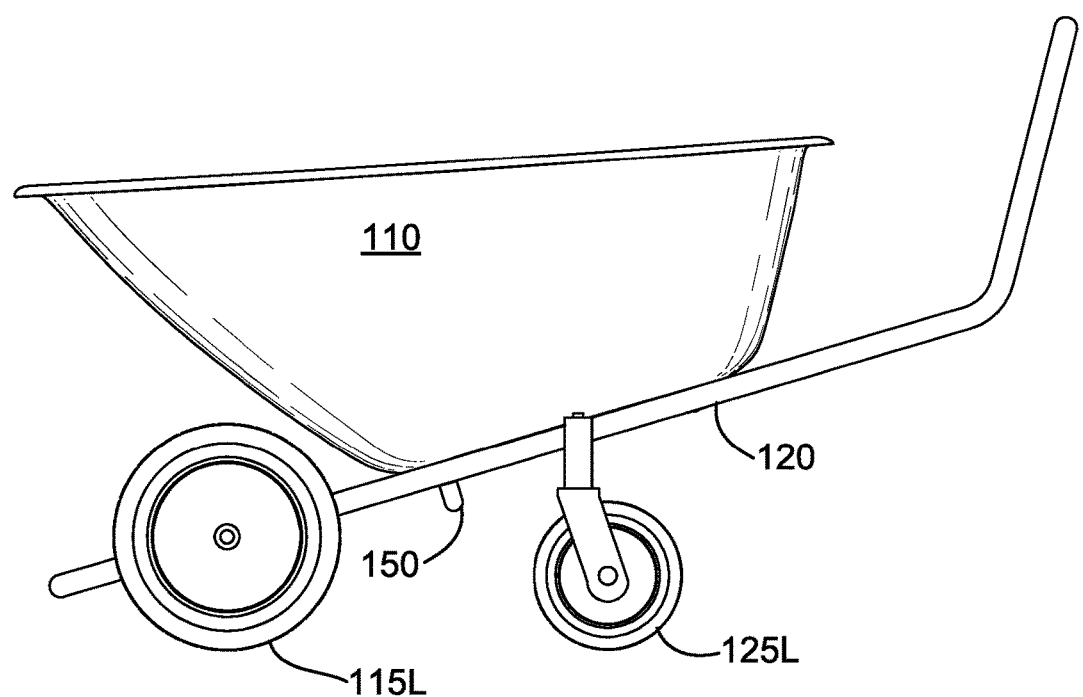
FIG. 4 is a left-side view of the exemplary embodiment of a utility cart illustrated in FIG. 1.
Figure 5:
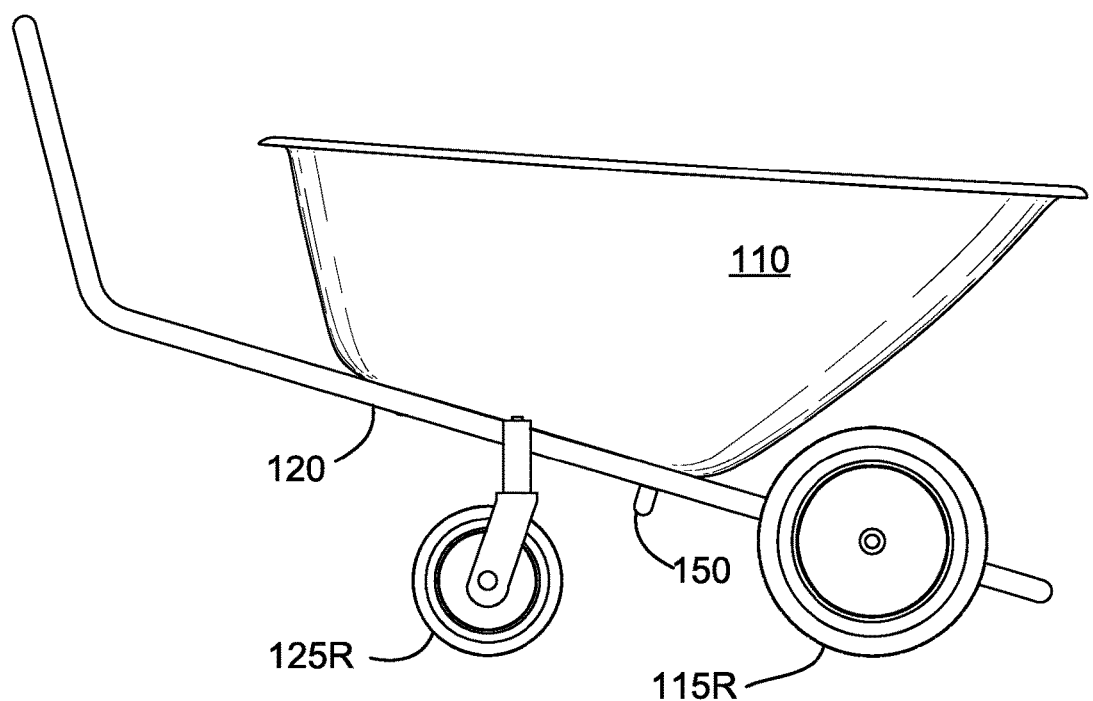
FIG. 5 is a right-side view of the exemplary embodiment of a utility cart illustrated in FIG. 1.

FIGS. 4 and 5, respectively, are left-side and right-side views of the exemplary embodiment of a utility cart illustrated in FIG. 1. The handle aspect 150 can be seen integrated into the frame 120 beneath the tub 110.

Figure 6:
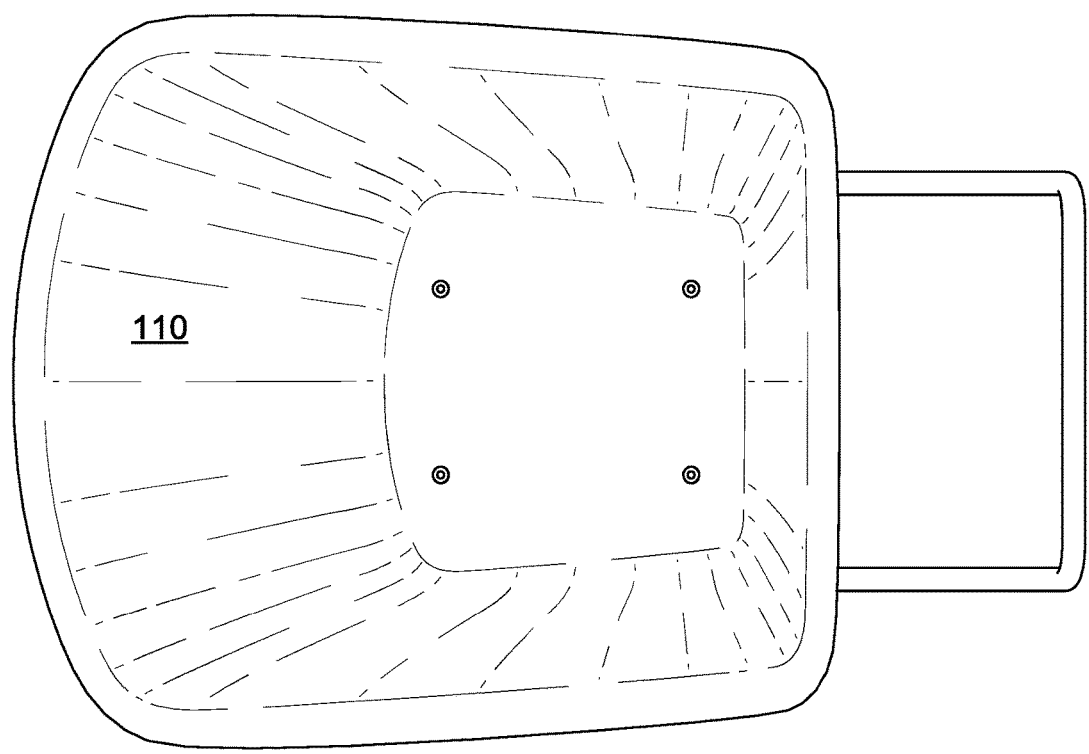
FIG. 6 is a top view of the exemplary embodiment of a utility cart illustrated in FIG. 1.

FIG. 6 is a top view of the exemplary embodiment of a utility cart illustrated in FIG. 1.

Figure 7:
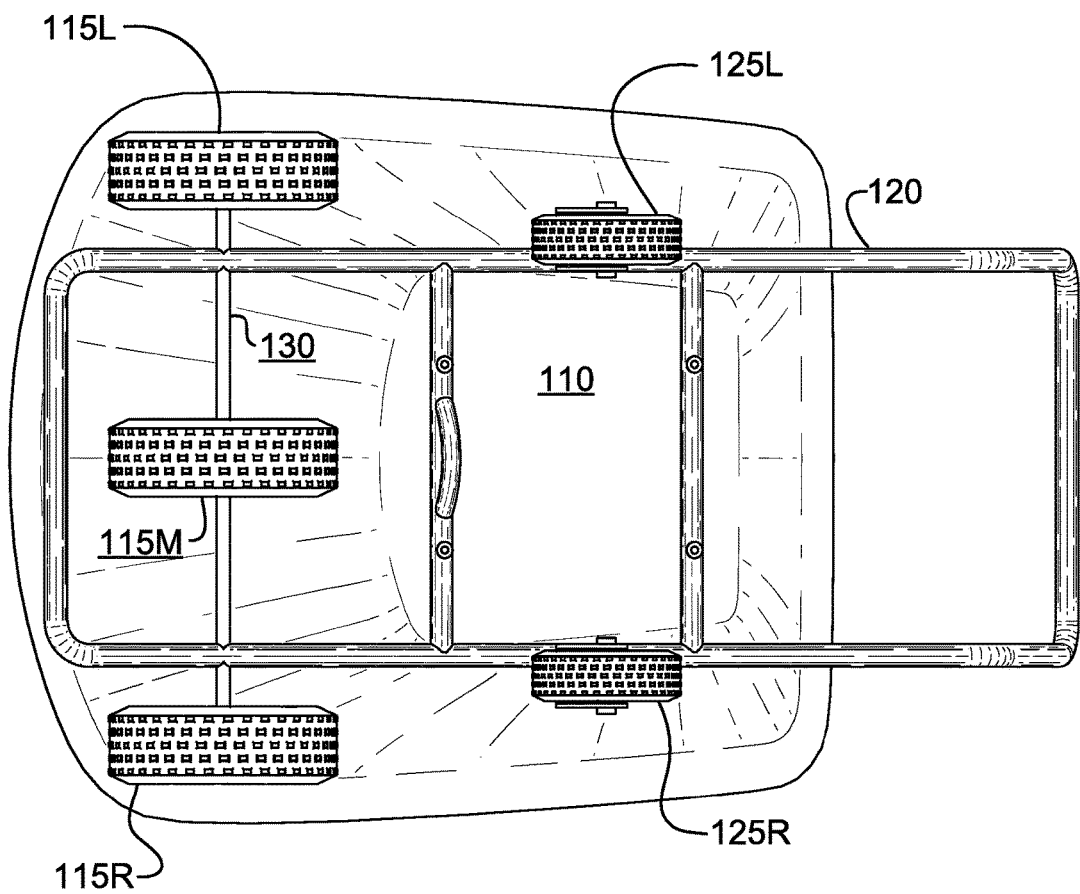
FIG. 7 is a bottom view of the exemplary embodiment of a utility cart illustrated in FIG. 1.

FIG. 7 is a bottom view of the exemplary embodiment of a utility cart illustrated in FIG. 1. In the FIG. 7 illustration, the pivoting rear wheels 125 can be seen as well as the front wheels 115 rotationally mounted on axle 130. The bottom side of tub 110 is shown. Notably, the particular shape of tub 110 is for illustrative purposes only and is not meant to indicate that embodiments of the solution are limited to any particular tub shape.

Figure 8:
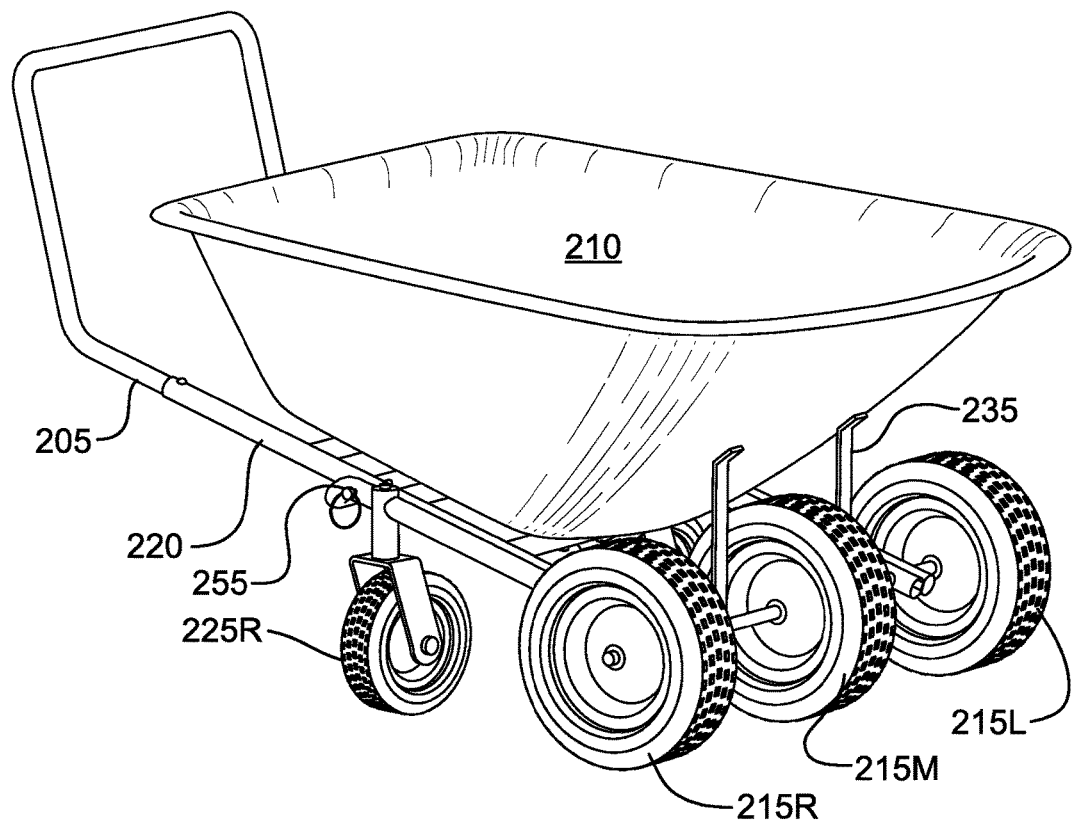
FIG. 8 is a perspective view of an exemplary embodiment of a utility cart according to the solution.

FIG. 8 is a perspective view of an exemplary embodiment of a utility cart according to the solution. The FIG. 8 embodiment comprises a hinged tub feature. Like the embodiment depicted in the FIG. 1-7 illustrations, the exemplary embodiment shown in the FIG. 8 illustration includes a tub 210 mounted atop a frame 220 that features an extendable and flippable handle 205. As would be understood by one of ordinary skill in the art viewing the FIG. 8 embodiment, the handle 205 may be pulled out from the frame 220, flipped and reinserted to the frame 220 such that the handle 205 may be better positioned for interfacing with a hitch of an ATV, tractor or the like. Although the FIG. 8 embodiment doesn't include a hitch feature on the handle 205, such is envisioned and would be understood to be possible by one of ordinary skill in the art. The FIG. 8 embodiment also includes a pair of struts 235 that provide an extra support means for the tub 210 to the frame 220. The FIG. 8 embodiment also includes a locking/release mechanism 255 for locking the tub 210 to the frame 220 and for releasing the tub 210 such that it may be pivoted forward and upward to dump a payload without the user having to tip the entire cart.

Figure 9:
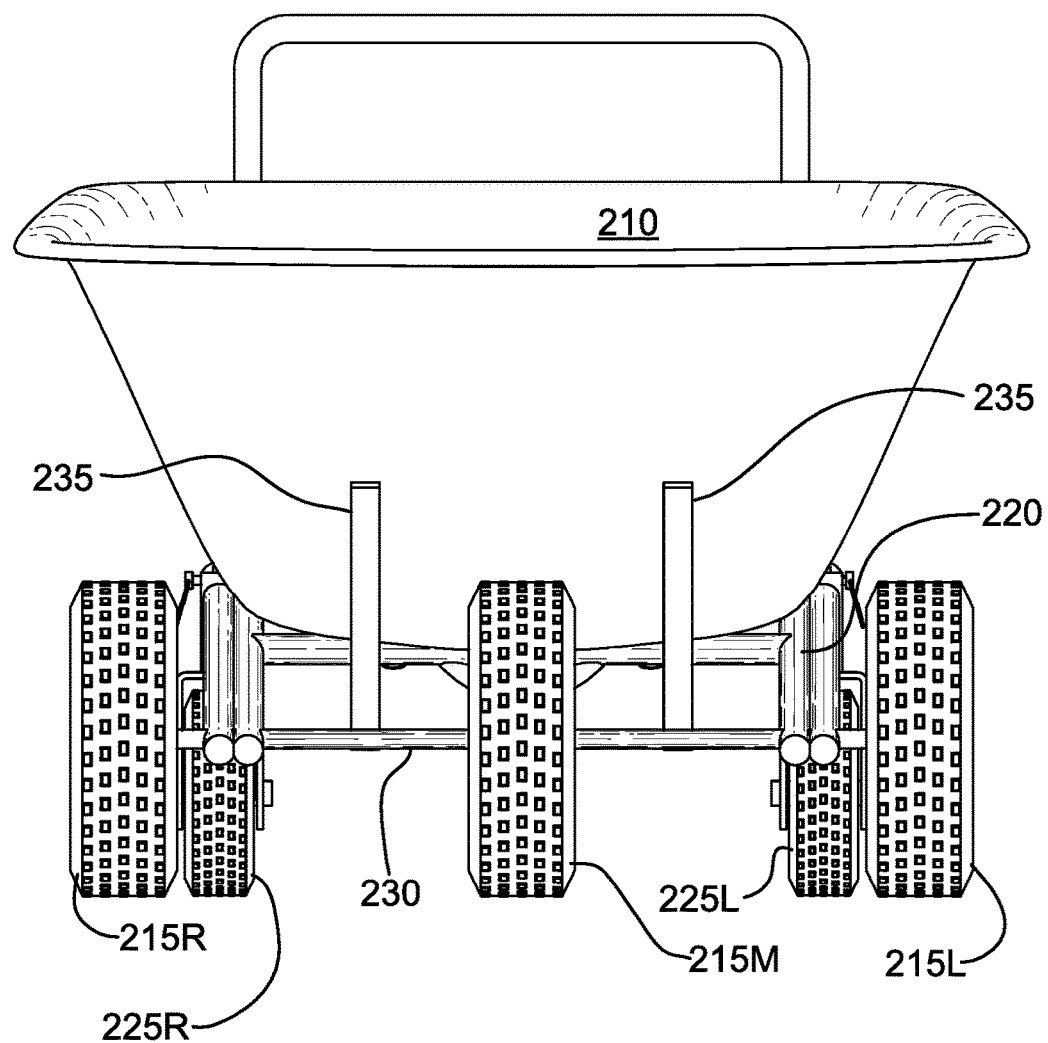
FIG. 9 is a front view of the exemplary embodiment of a utility cart illustrated in FIG. 8.

FIG. 9 is a front view of the exemplary embodiment of a utility cart illustrated in FIG. 8. In the FIG. 9 illustration, the struts 235, frame 220 (through which axle 230 extends), front wheels 215, tub 210, and pivoting rear wheels 225 can be seen.

Figure 10:
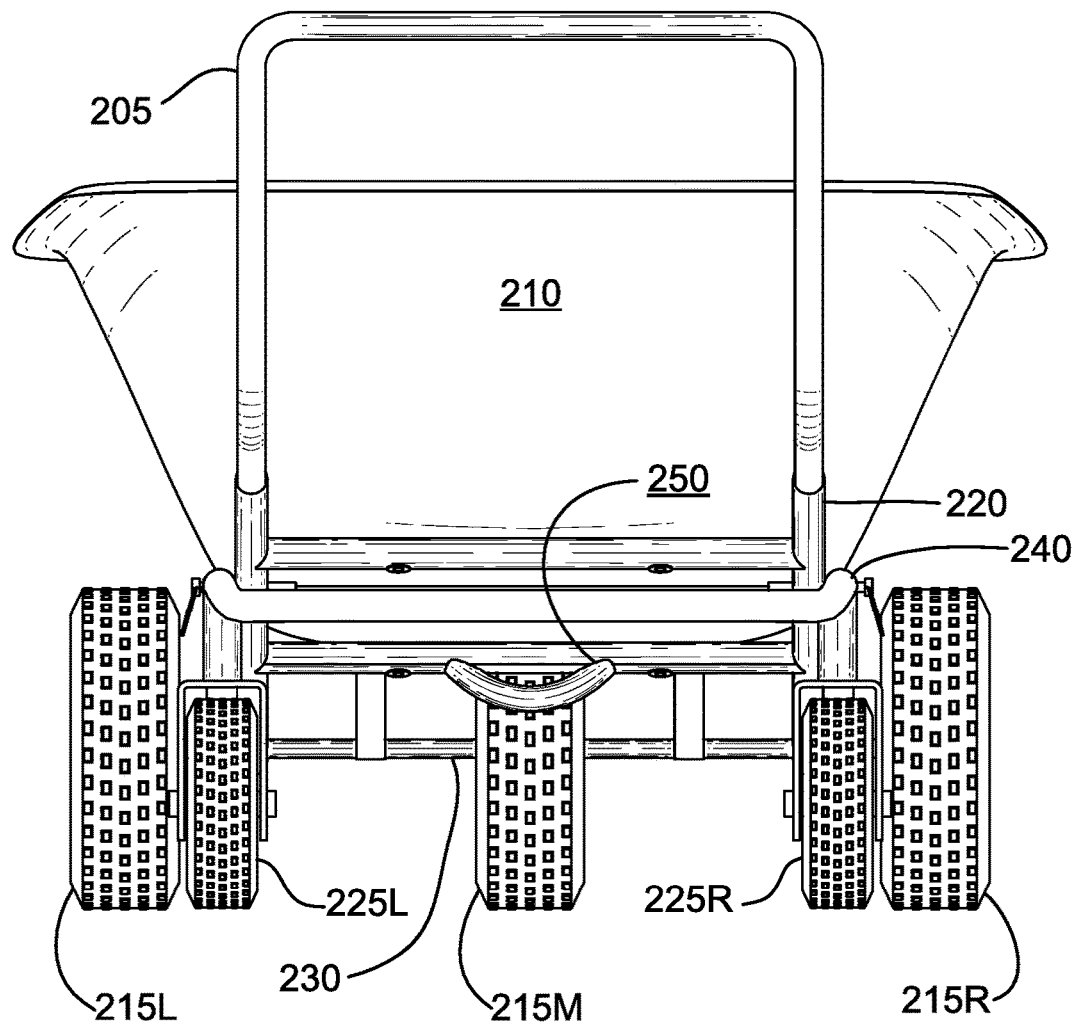
FIG. 10 is a back view of the exemplary embodiment of a utility cart illustrated in FIG. 8.

FIG. 10 is a back view of the exemplary embodiment of a utility cart illustrated in FIG. 8. The extendable and flippable handle 205 can be seen inserted into frame 220. A handle 250 useful for a user wishing to assist in tipping the pivotable portion of the frame 220 from the non-pivoting portion 240 can also be seen in the illustration.

Figure 11:
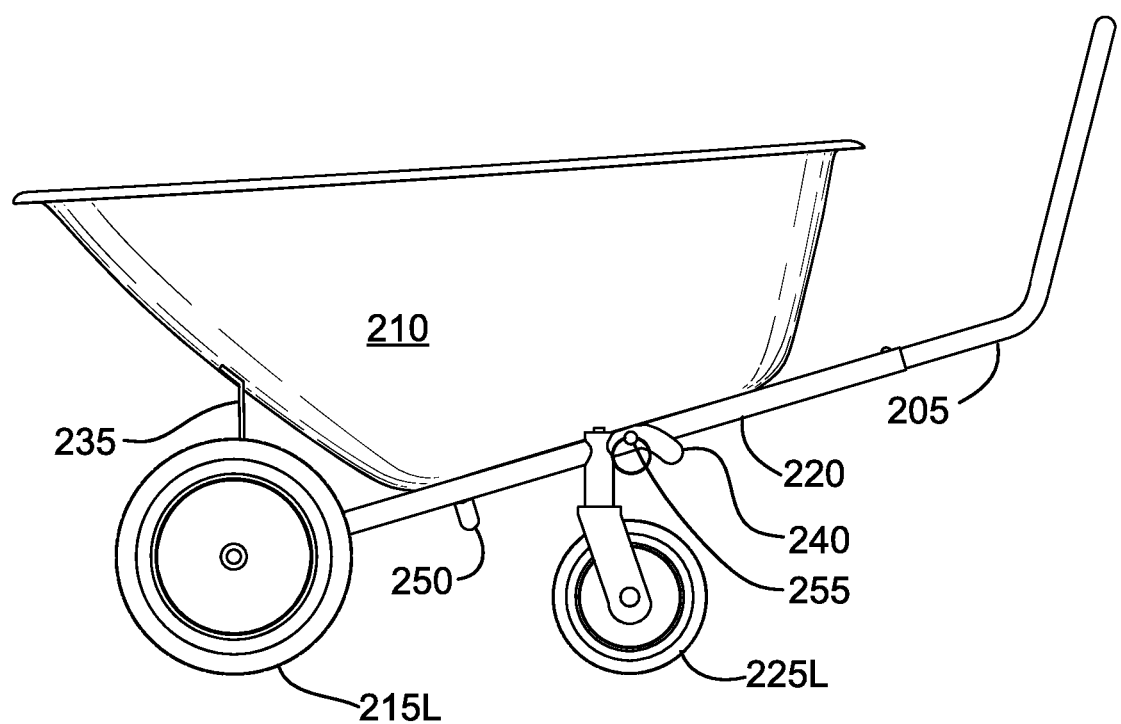
FIG. 11 is a left-side view of the exemplary embodiment of a utility cart illustrated in FIG. 8.
Figure 12:
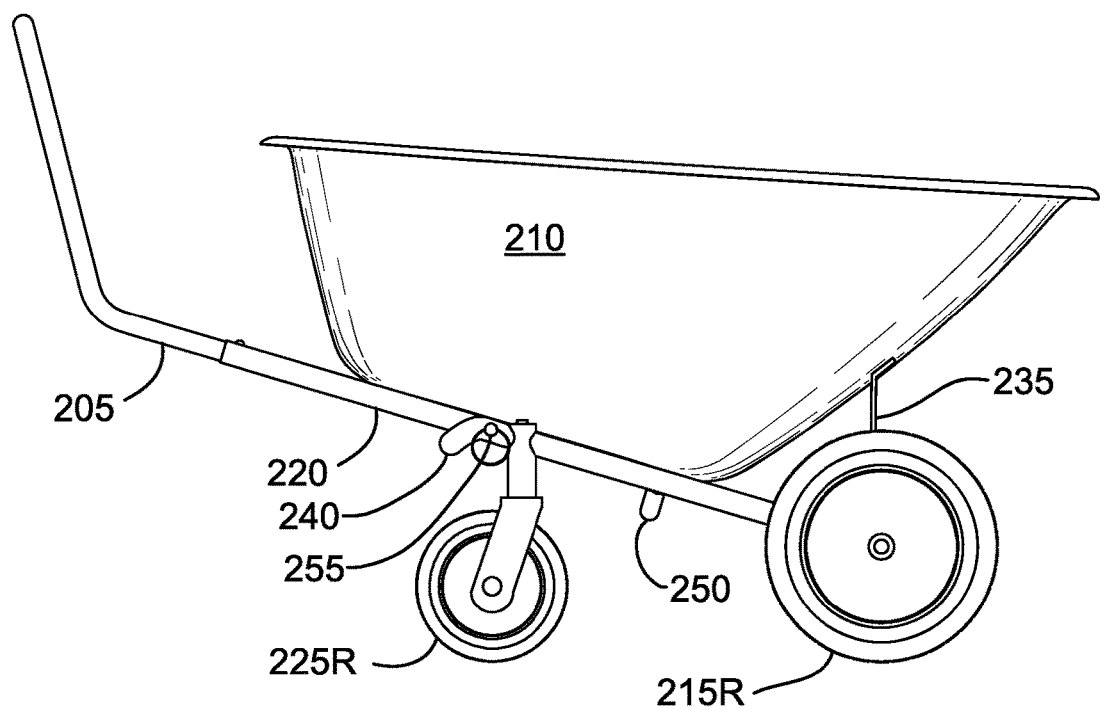
FIG. 12 is a right-side view of the exemplary embodiment of a utility cart illustrated in FIG. 8.

FIGS. 11-12 are left-side and right-side views, respectively, of the exemplary embodiment of a utility cart illustrated in FIG. 8. The locking/release mechanism 255 that releasably attaches the pivotable portion of frame 220 from the non-pivotable portion 240 can be seen.

Figure 13:
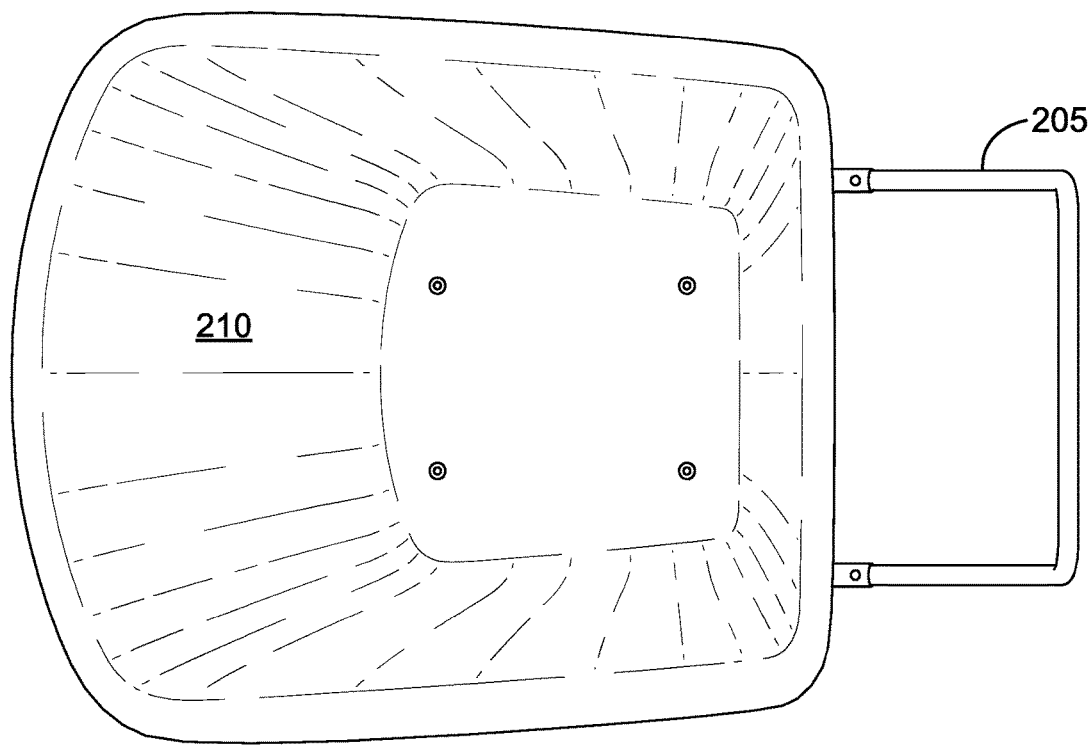
FIG. 13 is a top view of the exemplary embodiment of a utility cart illustrated in FIG. 8.

FIG. 13 is a top view of the exemplary embodiment of a utility cart illustrated in FIG. 8.

Figure 14:
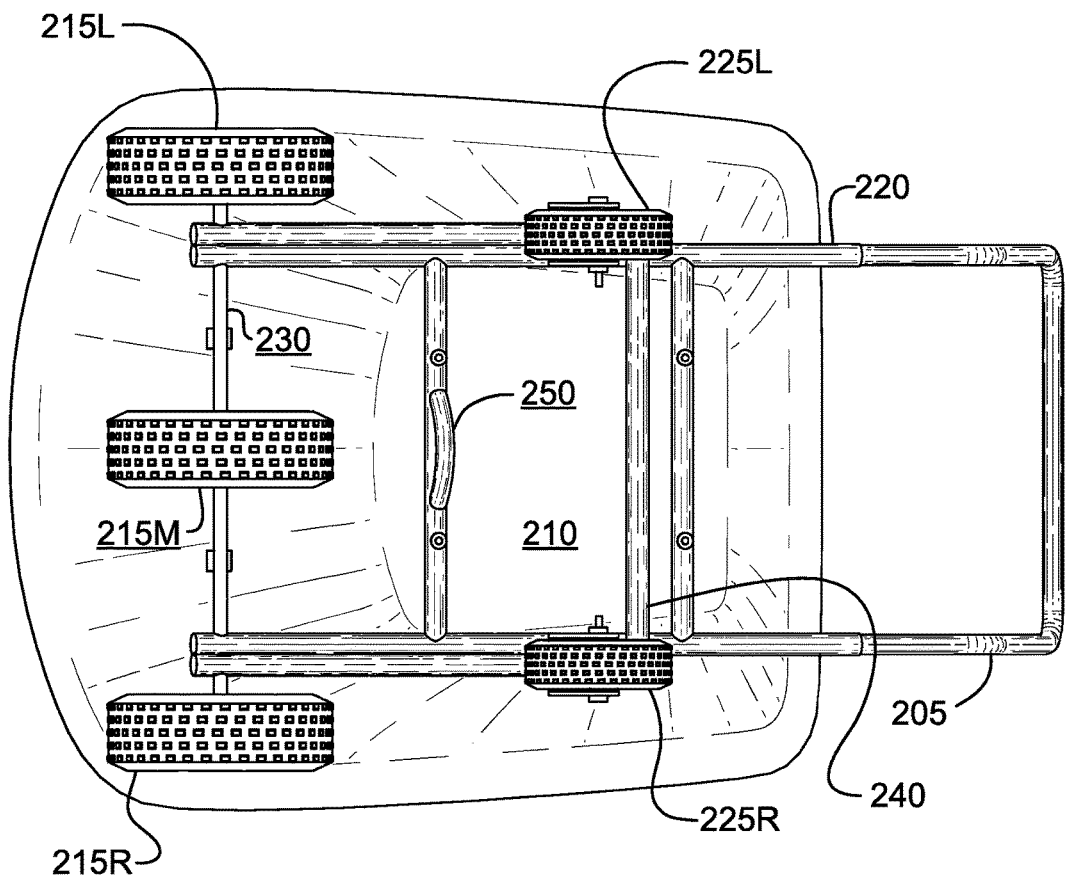
FIG. 14 is a bottom view of the exemplary embodiment of a utility cart illustrated in FIG. 8.

FIG. 14 is a bottom view of the exemplary embodiment of a utility cart illustrated in FIG. 8.

Figure 15:
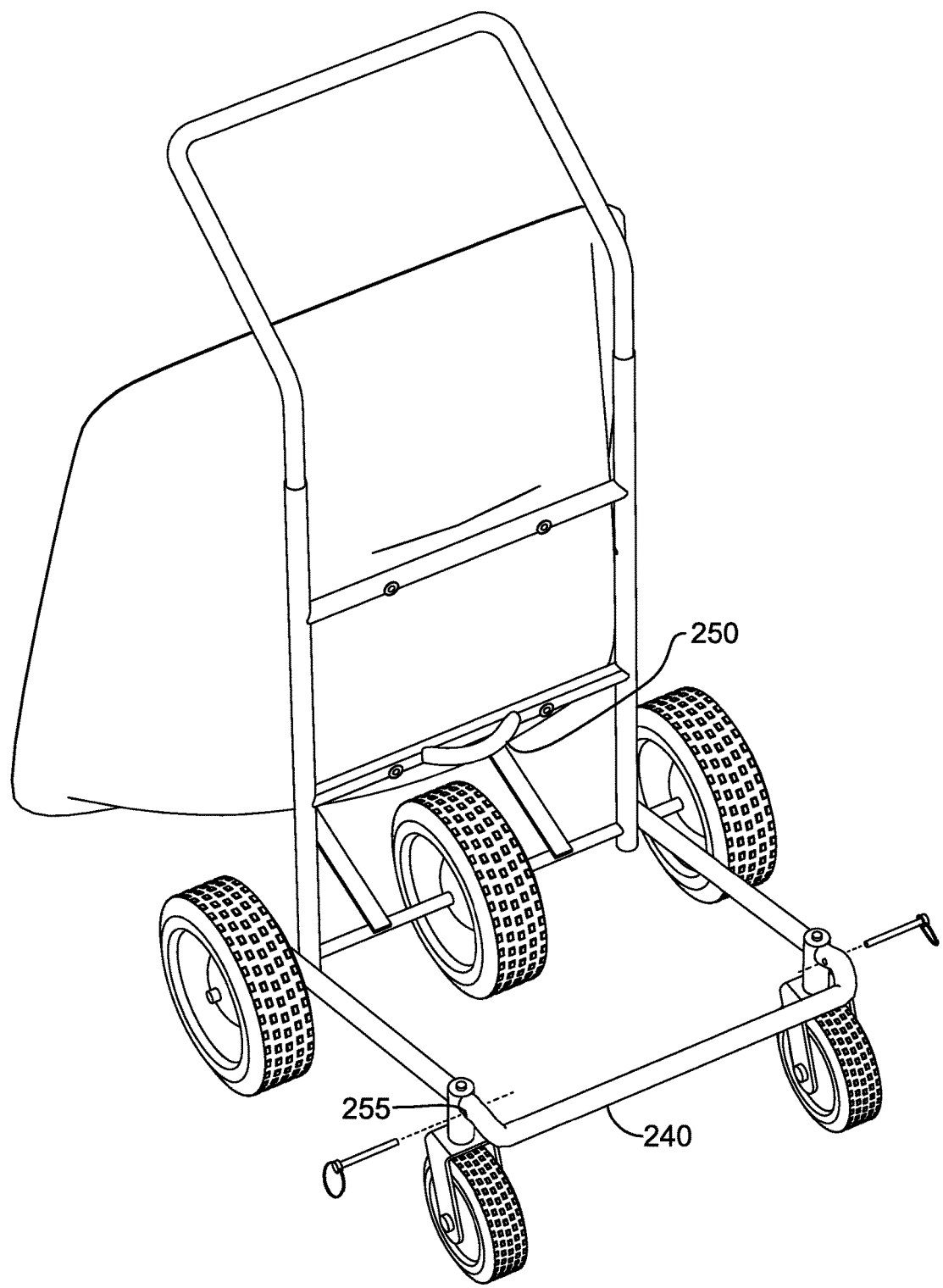
FIG. 15 is a rear perspective view of the exemplary embodiment of a utility cart illustrated in FIG. 8, shown in a dump state.

FIG. 15 is a rear perspective view of the exemplary embodiment of a utility cart illustrated in FIG. 8, shown in a dump state. The pivotable portion of the frame 220 is shown released by mechanism 255 from the non-pivotable portion of the frame 240 and tipped forward per a hinge mechanism. As would be understood by one of ordinary skill in the art reviewing the FIG. 15 illustration, the pivotable portion of frame 220 is rotationally mounted around axle 230 such that the tub 210 can be tipped forward. That is, the tub 210, mounted on pivotable frame portion 220, is rotationally hinged around the axle 230 such that the tub 210 and its sub-frame 220 rotate on the axle 230, thereby providing for upright positioning of the tub 210 without having to tip the entire cart.

Systems, devices and methods for a novel utility cart have been described using detailed descriptions of embodiments thereof that are provided by way of example and are not intended to limit the scope of the disclosure. The described embodiments comprise different features, not all of which are required in all embodiments of a utility cart according to the solution. Some embodiments of the solution utilize only some of the features or possible combinations of the features. Variations of embodiments of the solution that are described and embodiments of the solution comprising different combinations of features noted in the described embodiments will occur to persons of the art.

It will be appreciated by persons skilled in the art that systems, devices and methods for a novel utility cart according to the solution are not limited by what has been particularly shown and described herein above. Rather, the scope of systems, devices and methods a novel utility cart according to the solution is defined by the claims that follow.

What is claimed is:
1. A utility cart for transporting payloads, the utility cart comprising:
  a front axle having three front wheels including first and second outer wheels and a middle wheel between the first and second outer wheels;

a support frame comprised of a pivotable sub-portion and a non-pivotable sub-portion, wherein:
  the pivotable sub-portion includes first and second front ends, first and second rear ends, and a middle section that extends beneath and supports a tub aspect mechanically fixed to the pivotable sub-portion;
  the two front ends of the pivotable sub-portion are rotatable around the front axle to a dump state, with the first front end being rotatably attached to the front axle between the first outer wheel and the middle wheel, and the second front end being rotatably attached to the front axle between the second outer wheel and the middle wheel;
  the pivotable sub-portion and the non-pivotable sub-portion are configured to be releasably connected via a locking mechanism in a payload carry state; and
a bent handle aspect having a first end slidably extendable from the first rear end of the pivotable sub-portion of the support frame, and a second end slidably extendable from the second rear end of the pivotable sub-portion of the support frame;
and wherein the bent handle aspect is operable to be removed and reinstalled in a first orientation or a second orientation, wherein:
  when the handle aspect is in the first orientation it is positionable for use by a user to push the utility cart and when the handle aspect is in the second orientation it is positioned below the position of the handle in the first orientation; and
two rear wheels operable to swivel, each rear wheel being mechanically fixed to an opposing rear corner of the non-pivotable sub-portion.

2. The utility cart of claim 1, wherein the tub aspect is constructed from a steel.

3. The utility cart of claim 1, wherein the tub aspect is constructed from a plastic.

4. The utility cart of claim 1, wherein the support frame is constructed from tubular aluminum.

5. The utility cart of claim 1, further comprising a tipping handle integrated to the underside of the pivotable sub-portion such that the tipping handle provides a leverage point for tipping the cart into the dump state.

* * * * *